S. E. CREASEY.
MACHINE FOR EXTRACTING JUICE FROM FRUITS.
APPLICATION FILED JULY 3, 1916.
1,236,406.
Patented Aug. 14, 1917.
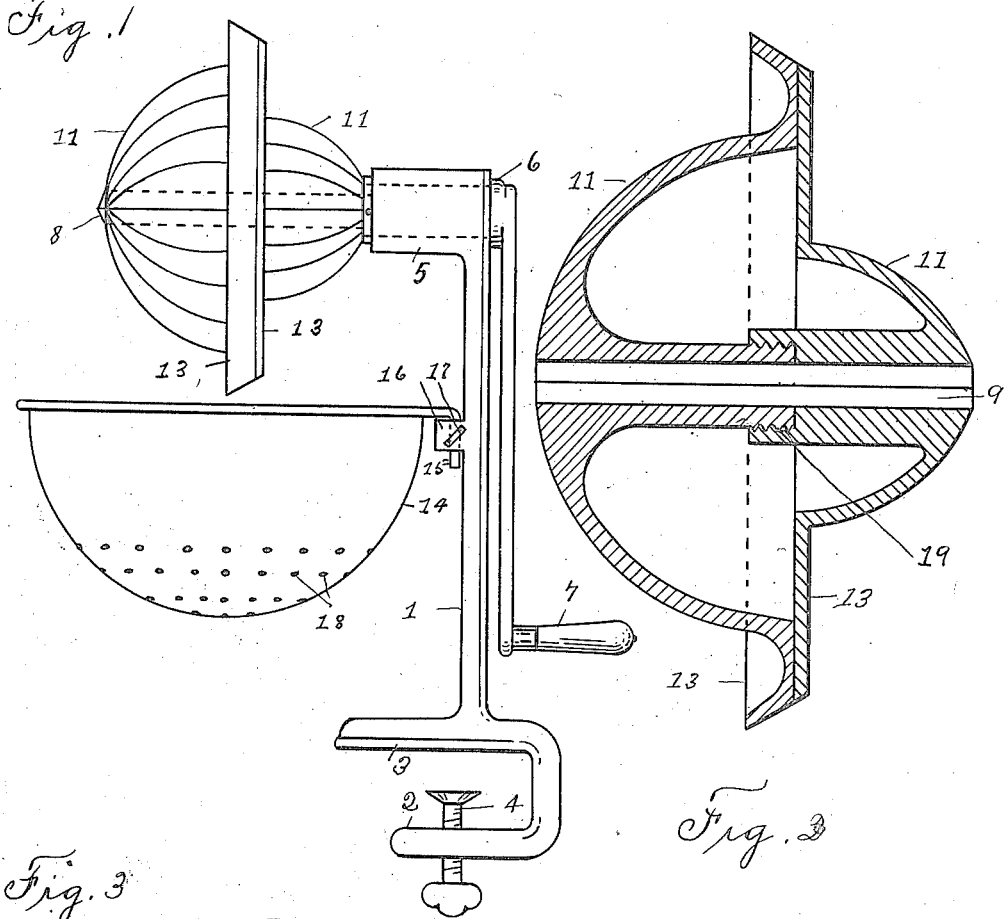
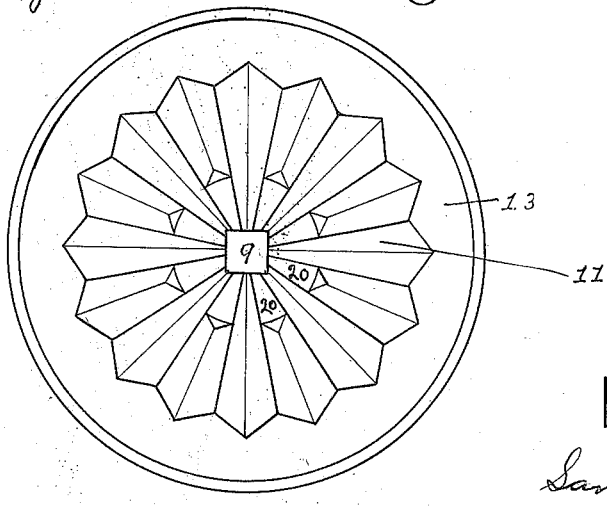
INVENTOR_
Samuel E. Creasey
by Ezra b. Vrrice
attorney

UNITED STATES PATENT OFFICE.

SAMUEL E. CREASEY, OF PORTLAND, MAINE.

MACHINE FOR EXTRACTING JUICE FROM FRUITS.

1,236,406.   Specification of Letters Patent.   Patented Aug. 14, 1917.

Application filed July 3, 1916. Serial No. 107,373.

*To all whom it may concern:*

Be it known that I, SAMUEL E. CREASEY, a citizen of the United States, residing at Portland, in the county of Cumberland and State of Maine, have invented certain new and useful Improvements in Machines for Extracting Juice from Fruits, of which the following is a specification.

This invention relates to improvements in machines for extracting juice from fruits. Its object is to provide a convenient and effective machine to extract juice from fruits, adapted to be used with fruits of various sizes, to remove all the juice and to prevent waste in the operation.

In the drawing herewith accompanying and forming a part of this application Figure 1 is an elevation of one embodiment of my device; Fig. 2 is a sectional view of the same, the supporting and operating parts being omitted, and Fig. 3 is an elevation of a modified form of the extractor proper.

Same reference characters indicate like parts in the several figures.

At the present time it has become the custom, especially in hotels, restaurants, drug stores and pleasure resorts, to serve fruit juice extracted direct from the fruit while you wait, the fruit being of various kinds and sizes, grape fruit and lemons for example. It is of the utmost importance to be able to do this rapidly.

In said drawings 1 is a supporting frame, adapted to be secured to a table, counter, shelf, etc., by means of clamping jaws 2 and 3 and an adjustable set screw 4. In a bearing 5 on said frame is a rotatable shaft 6 provided at one end with a handle 7 and having its other end 8 projecting beyond said bearing. The end 8 shown in detail in Fig. 1 is preferably non-circular in form to fit a similar non-circular hole 9 in the extractor, thus permitting it freely to rotate in its bearing and to hold and carry with it the extractor when mounted thereon. The extreme end of the shaft is pyramidal shaped for a purpose hereinafter described. The extractor proper consists of a bell-shaped form 11 having a fluted external surface tapering toward its apex and provided with a longitudinal shaft receiving hole 9 and with a circular flange 13 to direct the juice to the receptacle provided therefor. A receptacle 14 may be pivotally and removably mounted upon the frame 1 by means of a pivot pin 15 set in bearing 16 on the frame and may be locked in position by a set screw 17. The receptacle may be perforated as seen at 18 if desired.

To increase the efficiency of my device two extractors of different sizes may be united as seen in Figs. 1 and 2. In this case the two are placed base to base, concentric and thus have a continuous shaft receiving hole. The two may be united in any convenient manner, for example by a threaded union 19. The flanges should overlap when the two are placed base to base to exclude juice from the interior of the extractor.

In Fig. 3 I have shown a modified form of the external surface of the extractor. In some cases, especially in the larger sizes, the flutes, if all are continued to the apex, become so close together as to materially lessen the effect at that point. I therefore overcome this objection by removing a portion of the inner ends of alternate flutes as seen at 20.

The pyramidal shaped end of the shaft aids the insertion of the device in the fruit and the extraction of the juice from the extreme end of the fruit.

To operate my device the fruit is divided and held by one hand against the fluted extractor with sufficient pressure to cause the extractor to penetrate the fruit gradually, the extractor being rotated with the other hand by means of the handle. The extracted juice drains down upon the flange into the receptacle placed below. To adapt the device for fruits of different kinds it is only necessary to slide the extractor from the shaft and reverse it if the extractor is double as shown in Fig. 2, or substitute an extractor of different size if they are made separately.

I claim:

1. In a device of the character described, a bearing, a shaft mounted in said bearing having a non-circular free end, a fluted extractor provided with a non-circular shaft receiving hole, said extractor being adapted to move longitudinally but not rotatably relative to said shaft and means whereby the shaft and extractor may be rotated.

2. In a device of the character described, a bearing, a fluted extractor provided with a central shaft receiving hole, a shaft mounted in said bearing having a tapered end angular in cross section adapted to project beyond and form the apex of the extractor when the extractor is moved home on the shaft, and means whereby said shaft and extractor may be rotated.

3. In a device of the character described, a bearing, a shaft mounted in said bearing, an extractor comprising two fluted hemispheres placed back to back mounted upon said shaft, the two hemispheres being of different sizes and provided with a continuous central shaft receiving hole extending through both and means whereby said shaft and extractor may be rotated.

4. In a device of the character described a bearing, a shaft mounted in said bearing, a fluted extractor comprising two hemispheres placed back to back and provided with flanges extending outwardly from the adjacent surfaces and with a central shaft receiving hole extending through both hemispheres, the two hemispheres being of unequal sizes, and means whereby said shaft and extractor may be rotated.

In testimony whereof I affix my signature.

SAMUEL E. CREASEY.